(12) United States Patent
Kang et al.

(10) Patent No.: US 10,833,342 B2
(45) Date of Patent: Nov. 10, 2020

(54) THREE-DIMENSIONAL MEMBRANE ELECTRODE ASSEMBLY, FUEL CELL PROVIDED WITH THE SAME AND FABRICATION METHOD THEREOF

(71) Applicant: INDUSTRY FOUNDATION OF CHONNAM NATIONAL UNIVERSITY, Gwangju (KR)

(72) Inventors: Ki Ju Kang, Jeollanam-do (KR); Hoang Xuan Nguyen, Ha Tinh Province (VN); Seung Hun Jung, Gwangju (KR); Seung Chui Han, Gwangju (KR)

(73) Assignee: INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 0 days.

(21) Appl. No.: 15/812,225

(22) Filed: Nov. 14, 2017

(65) Prior Publication Data
US 2018/0351191 A1    Dec. 6, 2018

(30) Foreign Application Priority Data

Jun. 1, 2017    (KR) .................. 10-2017-0068655

(51) Int. Cl.
*H01M 8/1004*    (2016.01)
*H01M 8/1007*    (2016.01)
(Continued)

(52) U.S. Cl.
CPC ....... *H01M 8/1004* (2013.01); *H01M 4/8605* (2013.01); *H01M 4/881* (2013.01);
(Continued)

(58) Field of Classification Search
CPC ............ H01M 8/1004; H01M 8/1007; H01M 8/1023; H01M 8/1039; H01M 8/1081;
(Continued)

(56) References Cited

U.S. PATENT DOCUMENTS

| | | | | |
|---|---|---|---|---|
| 6,080,501 A | * | 6/2000 | Kelley | ................ H01M 8/1023 429/421 |
| 7,736,772 B2 | * | 6/2010 | Sarkar | .................. B01D 53/228 429/466 |
| 2006/0083852 A1 | * | 4/2006 | Jeon | ........................ H01M 4/94 427/115 |

FOREIGN PATENT DOCUMENTS

| | | |
|---|---|---|
| KR | 10-1341216 B1 | 1/2014 |
| KR | 10-1699943 B1 | 1/2017 |

OTHER PUBLICATIONS

Shinji Motokawa, et al., "MEMS-based design and fabrication of a new concept micro direct methanol fuel cell (μ-DMFC)", Electrochemistry Communications, Mar. 25, 2004, pp. 562-565, vol. 6.

(Continued)

Primary Examiner — Jimmy Vo
(74) Attorney, Agent, or Firm — Paratus Law Group, PLLC (57) ABSTRACT

A fuel cell and a membrane electrode assembly used therein. The membrane electrode assembly is a three-dimensional membrane electrode assembly for fuel cell configured as a three-dimensional thin film structure in which an inner space is divided into two intertwined subvolumes by an interface, and the interface is configured as an MEA thin film and a first subvolume of the two subvolumes is provided as a channel for fuel and a second subvolume is provided as a channel for an oxidizer. The fuel cell includes a casing which accommodates the three-dimensional membrane electrode assembly therein and independently communicates with the (Continued)

first subvolume and the second subvolume and includes inlets and outlets for the fuel and the oxidizer.

15 Claims, 10 Drawing Sheets

(51) Int. Cl.
*H01M 8/1039* (2016.01)
*H01M 8/1081* (2016.01)
*H01M 4/88* (2006.01)
*H01M 4/86* (2006.01)
*H01M 8/1023* (2016.01)
*H01M 8/1069* (2016.01)
*H01M 8/1018* (2016.01)
*H01M 4/92* (2006.01)

(52) U.S. Cl.
CPC ....... *H01M 4/8828* (2013.01); *H01M 4/8892* (2013.01); *H01M 8/1007* (2016.02); *H01M 8/1023* (2013.01); *H01M 8/1039* (2013.01); *H01M 8/1076* (2013.01); *H01M 8/1081* (2013.01); *H01M 4/926* (2013.01); *H01M 2008/1095* (2013.01)

(58) Field of Classification Search
CPC .. H01M 4/8605; H01M 4/881; H01M 4/8828; H01M 4/8892; H01M 4/926
See application file for complete search history.

(56) References Cited

OTHER PUBLICATIONS

Jongkwang Lee, et al., "Micro space power system using MEMS fuel cell for nano-satellites", Acta Astronautica, Jan. 6, 2014, pp. 165-169, vol. 101.

Nam-Trung Nguyen, et al., "Micromachined polymer electrolyte membrane and direct methanol fuel cells—a review", Journal of Micromechanics and Microengineering, Oct. 21, 2005, R1-R12, vol. 16.

Stephen Hyde, et al., The Language of Shape: The Role of Curvature in Condensed Matter: Physics, Chemistry and Biology 1st Edition, Elsevier Science, Nov. 19, 1996, ISBN: 978-0-444-81538-5.

Martin Maldovan, et al., Periodic Materials and Interference Lithography: For Photonics, Phononics and Mechanics, Wiley-VCH Verlag GmbH&Co. KGaA, Aug. 4, 2009, ISBN: 978-3-527-31999-2.

Sebastian C. Kapfer, et al., "Minimal surface scaffold designs for tissue engineering", Biomaterials, May 20, 2011, pp. 6875-6882, vol. 32.

Seung Chul Han, et al., "A New Type of Low Density Material: Shellular", Advanced Materials, Aug. 19, 2015, pp. 5506-5511, vol. 27.

Rafael Kuwertz, et al., "Influence of acid pretreatment on ionic conductivity of Nafion® membranes", Journal of Membrane Science, Aug. 2, 2015, pp. 225-235, vol. 500.

Ju Chou, et al., "Electrolithographic Investigations of the Hydrophilic Channels in Nafion Membranes", The Journal of Physical Chemistry B, Sep. 16, 2004, pp. 3252-3256, vol. 109.

N. R. Nik Roselina, et al., "Ni nanoparticles: Study of particles formation and agglomeration", Procedia Engineering, Aug. 25, 2012, pp. 1620-1626, vol. 41.

* cited by examiner

FIG. 1

-Related Art-

THREE-DIMENSIONAL MEMBRANE ELECTRODE ASSEMBLY, FUEL CELL PROVIDED WITH THE SAME AND FABRICATION METHOD THEREOF

CROSS-REFERENCE TO RELATED APPLICATIONS

This application claims priority to Korean Patent Application No. 10-2017-0068655 filed on Jun. 1, 2017, the disclosure of which is incorporated herein by reference.

BACKGROUND

The present disclosure relates to a fuel cell in which fuel and an oxidizer electrochemically react with each other so as to generate electric energy and a membrane electrode assembly used therein.

In general, a fuel cell is a device configured to electrochemically react fuel and an oxidizer so as to generate electric energy. Such a chemical reaction occurs at an interface between a catalyst and an electrolyte and enables continuous generation of electricity as long as fuel is supplied. That is, unlike a general chemical cell configured to chemically store and release electric energy in a closed system, a fuel cell is supplied with fuel and an oxidizer from the outside and produces electric power. Further, an electrode of the general chemical cell varies in output depending on its state of charge or discharge, but an electrode of the fuel cell performs steady-state operation and thus can relatively stably maintain the output. Meanwhile, any fuel cell includes an anode, a cathode, and an electrolyte that allows positive ions to pass through. Fuel cells can be classified by the kind of an electrolyte, and specifically, a polymer electrolyte membrane fuel cell (hereinafter, referred to as "PEMFC") is typically used at an operating temperature of less than 100° C. as a power source for home, portable, or car use.

Figure 1:
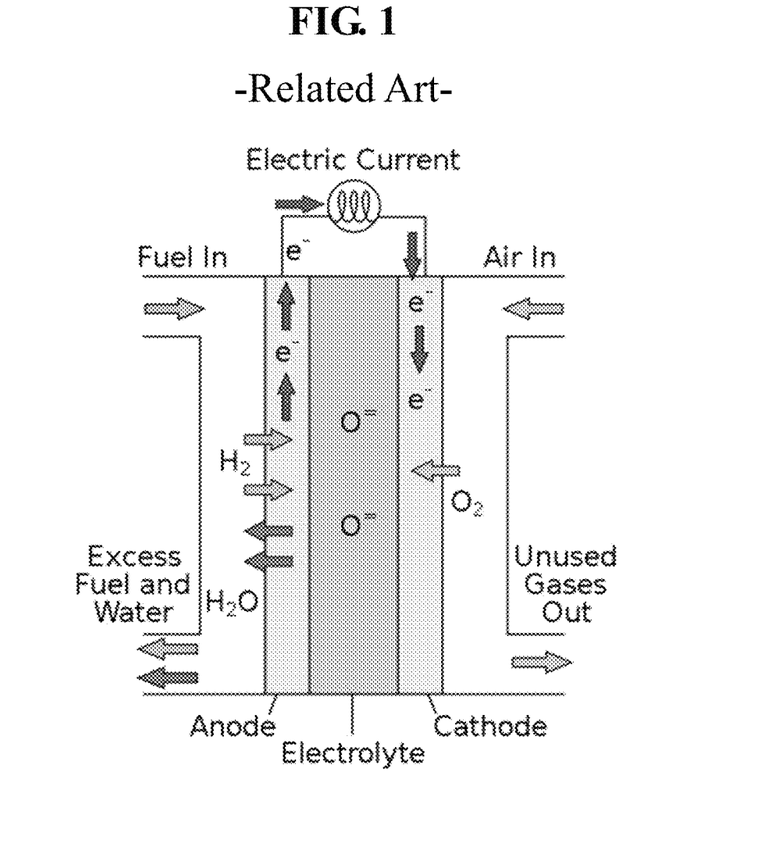
FIG. 1 is a conceptual diagram of a fuel cell according to a conventional technology.

FIG. 1 is a conceptual diagram of a conventional PEMFC. A basic structure of this fuel cell is configured as a membrane electrode assembly (hereinafter, referred to as "MEA") including a fuel electrode (anode), an oxygen electrode or air electrode (cathode), and an electrolyte membrane provided between the two electrodes, and the two electrodes are used as being connected to an external circuit. In the fuel cell which is configured to directly convert chemical energy into electric energy, an oxidation reaction of a fuel such as hydrogen or methanol occurs in the fuel electrode (anode) and a reduction reaction of oxygen occurs in the oxygen electrode or air electrode (cathode). In this case, the electrolyte membrane of the MEA functions as a kind of ion-exchange membrane to move hydrogen ions generated from the fuel electrode by catalytic reaction to the oxygen electrode and as a separation membrane to suppress direct mixing between fuel and air.

Figure 2:
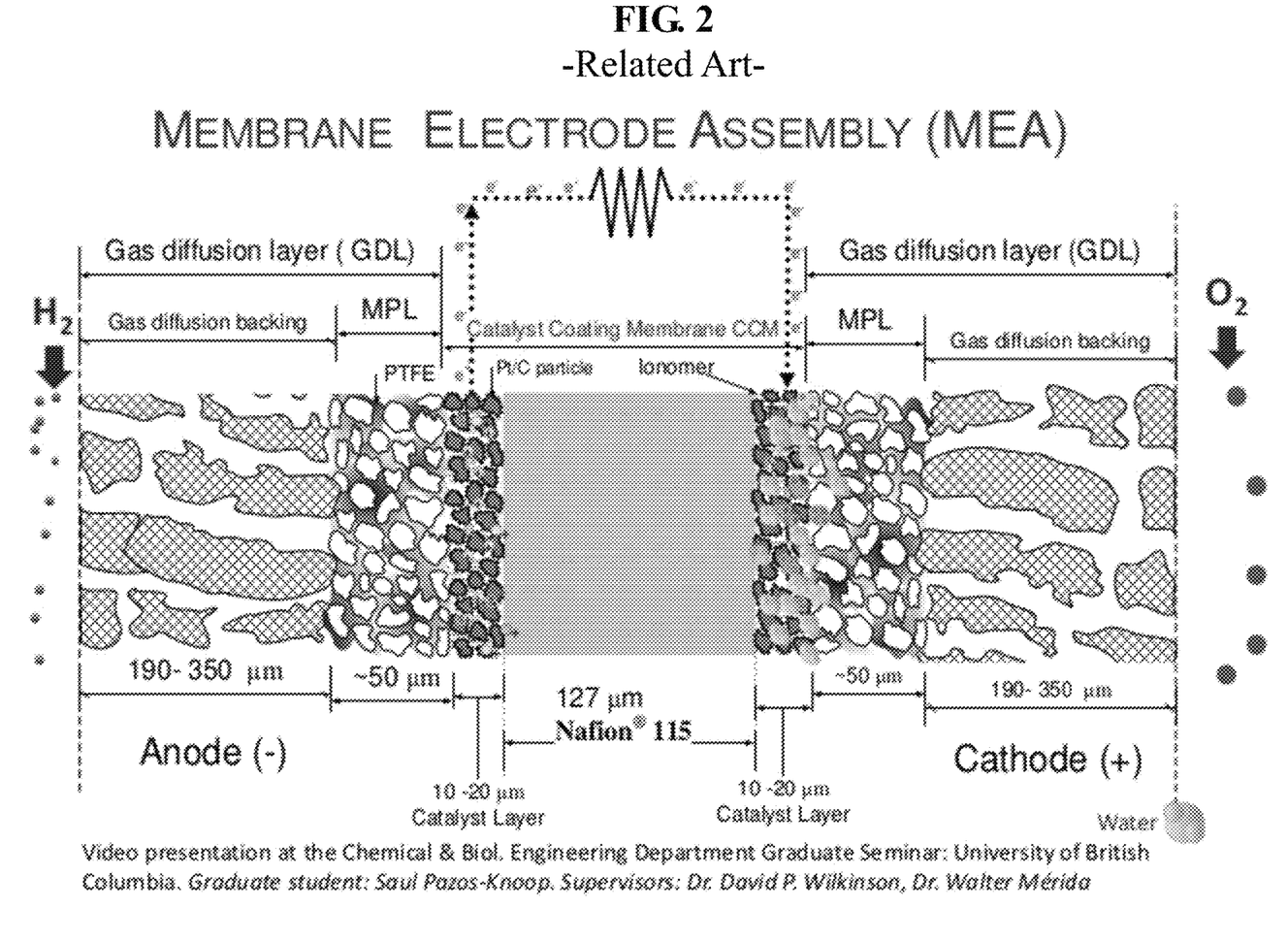
FIG. 2 is a configuration view of a membrane electrode assembly within the fuel cell according to the conventional technology.

FIG. 2 illustrates a MEA configuration and an operating principle of the PEMFC. In the conventional fuel cell, fuel such as hydrogen or alcohol supplied through a flow channel and an oxidizer such as oxygen or air are diffused through a gas diffusion layer of the electrodes and transferred to an interface between a catalyst and a polymer electrolyte and thus make an electrochemical reaction. To this end, a separator (not illustrated) configured to form a flow field needs to be used. The separator is fabricated using metal or carbon which does not react with a reactant. As for carbon, it is difficult to fabricate the separator to be thin due to its brittleness, and metal is likely to be eroded by the reactant and causes an increase in weight of the fuel cell due to its high density. Further, a cooling plate is necessary to maintain a temperature of the cell to 100° C. or less in order to maintain an ion conductivity of an ion-exchange membrane formed of a polymer. Therefore, the thickness and the weight of the stack are further increased. In spite of many advantages of the fuel cell, the system has a large volume and the stack itself is heavy, and, thus, it is not easy to mount the fuel cell in an unmanned aerial vehicle or drone which requires high output.

Further, in the conventional fuel cell, while electrons generated from a catalyst layer are moving to a current collector through a gas diffusion layer and the separator, voltage loss occurs at a contact point of heterogeneous materials due to a contact resistance. Particularly, a high electrical resistance may be generated at an interface between the separator and the gas diffusion layer formed of carbon paper or carbon felt. In order to overcome this problem, there has been made an effort to fuse the carbon felt with the separator. However, it has been reported that the amount of the polymer needs to be increased to perform such fusion, and, thus, electric conductivity is decreased.

Further, in the conventional PEMFC structure including the flow channel and the MEA, in order to compensate such a loss and increase the output of the cell, a voltage has been increased by laminating a lot of unit cells in series or a current has been increased by increasing the area of the cell. However, according to these two methods, the volume and weight of the fuel cell stack is increased, and, thus, it is difficult to use the fuel cell stack for portable or car use. In general, a weight and a volume allowed for a fuel cell stack used for portable or car use are limited. Therefore, it is necessary to secure a maximum space to load fuel to minimize the weight and the volume of the stack. As such, the fuel cell stack needs to have a high output as well as low weight and small volume. Therefore, a conventional electrode structure is limited in increasing a reaction area and it is very difficult to develop a high-output fuel cell for portable/car use.

Furthermore, in the conventional PEMFC, if moisture generated within the electrode is not discharged smoothly to the outside, the moisture covers a reaction interface of the catalyst layer and an electrochemical reaction as an interfacial phenomenon does not occur well, which is called flooding. If a fuel cell is miniaturized, a flow channel is decreased in size, which causes an increase in flow resistance and thus inhibits enough supply of fuel and an oxidizer. That is, a conventional flow structure is limited in miniaturizing a fuel cell. Further, if a general MEA is used in a micro fuel cell, a current density is too low, and, thus, the amount of power generation is smaller than pumping power required for supply of fuel and an oxidizer. Also, the micro fuel cell uses a silicon substrate processed by MEMS technology for the internal flow structure. However, as for a high-temperature fuel cell, it is difficult to fabricate the cell to have a small thickness due to damage to the silicon substrate caused by thermal strain and thermal stress (S. Motokawa, M. Mohamedi, T. Momma, S. Shoji, T. Osaka, MEMS-based design and fabrication of a new concept micro direct methanol fuel cell, Electrochemistry communications, 6, (2004) 562-565. J. Lee, T. Kim, Micro space power system using MEMS fuel cell for nano-satellites, Acta Astronautica, 101, (2014) 165-169. N. T. Nguyen, S. H. Chan, Micromachined polymer electrolyte membrane and direct methanol fuel cells—a review, J. Micromech. Microeng., 16, (2006) R1-R2.)

Figure 3:
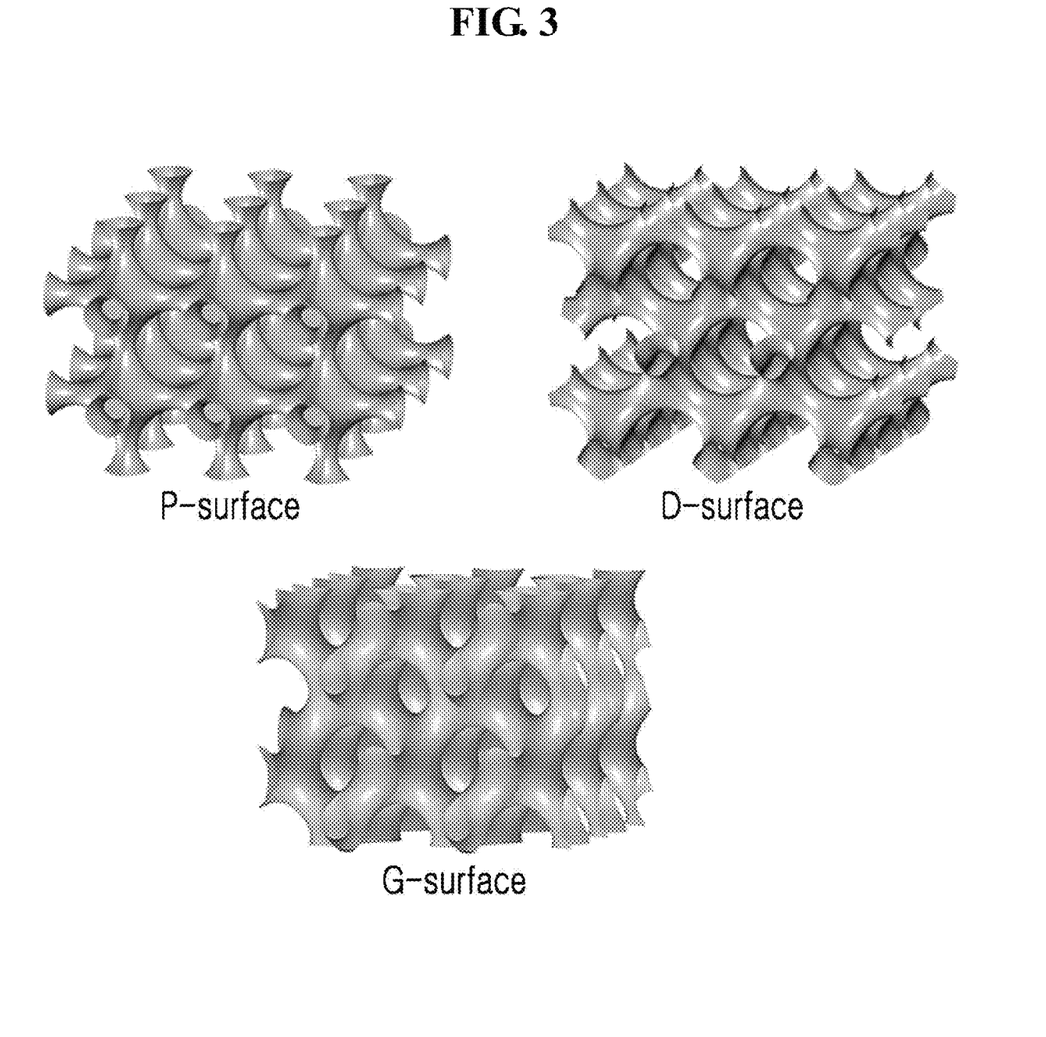
FIG. 3 is a configuration view of an exemplary triply periodic minimal surface (TPMS)

Meanwhile, in 1865, H. A. Schwarz, a German mathematician, presented a triply periodic minimal surface (TPMS) having zero mean curvature as a curve structure which is non-self intersecting but repeated periodically in three-dimensional space. In this case, the mean curvature means a mean value of the maximum curvature and the minimum curvature in two directions perpendicular to each other at a point on a three-dimensional plane and refers to the degree of curve of the three-dimensional plane. In the 1960s, A. Schoen arranged them and added some new TPMSes (S. Hyde et al., The Language of Shape, Elsevier, 1997, ISBN: 978-0-444-81538-5). These TPMS have various shapes, and particularly, P-, D-, and G-surfaces as illustrated in FIG. 3 have been most typically cited in the fields of chemistry and biology. In nature, a TPMS can be found in a water-emulsifier mixture, a cell membrane, a sea urchin epidermal tissue, a silicate meso-phase, and the like, and is present in the form of an interface separating two phases in most cases but cannot be found in the form of a porous lightweight structure.

Further, the TPMS having zero mean curvature divides a space into two continuous subvolumes, and the two subvolumes have the same volume ratio of 1:1. Even if the two subvolumes have different volume ratios, a curved surface of a minimal surface having a constant mean curvature separating the two subvolumes can be defined and this curved surface is also referred to as TPMS (Reference Document: M. Maldovan and E. L. Thomas, Periodic Materials and Interference Lithography, 2009 WILEY-VCH Verlag GmbH & Co. KGaA, ISBN: 978-3-527-31999-2).

The two subvolumes defined by dividing a space with the curved surface in the form of TPMS are continuous and intertwined with each other. If a thin film structure is fabricated in the form of TPMS, a mean curvature is constant anywhere in a curved surface of the thin film. Thus, when an external load is applied, a stress is not concentrated on any one portion. Therefore, it is known that early local buckling which occurs in the above-described very low-density material does not occur and the strength is high for the weight (S. C. Kapfer, S. T. Hyde, K. Mecke, C. H. Arns, G. E. Schroder-Turk, Minimal surface scaffold designs for tissue engineering, Biomaterials 32(2011) 6875-6882). Also, each subvolume surrounded by a smooth curved surface has a large surface area and has high permeability when a fluid flows therein. Therefore, the thin film present between the two subvolumes is highly applicable as a heat and mass transfer interface between the two subvolumes.

Recently, two remarkable methods have been suggested as a practical process for fabricating a thin film structure in the form of TPMS. Seung Chul Han et al. have reported that a structure similar to P-surface illustrated in FIG. 3 can be fabricated by applying a method of fabricating a polyhedral structure of a thin film based on photo lithography as disclosed in Korean Patent No. 1341216 (Seung Chul Han, Jeong Woo Lee, Kiju Kang, A New Type of Low Density Material; Shellular, Advanced Materials, pp. 5506-5511, 2015.). Also, Kiju Kang et al. have suggested a technology of fabricating a thin film structure in the form of P-surface and D-surface based on a wire woven structure in Korean Patent No. 1699943.

PRIOR ART DOCUMENT

Patent Document (Patent Document 1)—Korean Patent No. 1341216
(Patent Document 2)—Korean Patent No. 1699943

Non-Patent Document (Non-patent Document 1)—S. Motokawa, M. Mohamedi, T. Momma, S. Shoji, T. Osaka, MEMS-based design and fabrication of a new concept micro direct methanol fuel cell, Electrochemistry communications, 6, (2004) 562-565.
(Non-patent Document 2)—J. Lee, T. Kim, Micro space power system using MEMS fuel cell for nano-satellites, Acta Astronautica, 101, (2014) 165-169.
(Non-patent Document 3)—N. T. Nguyen, S. H. Chan, Micromachined polymer electrolyte membrane and direct methanol fuel cells—a review, J. Micromech. Microeng., 16, (2006) R1-R2.
(Non-patent Document 4)—S. Hyde et al. The Language of Shape. Elsevier, 1997, ISBN: 978-0-444-81538-5
(Non-patent Document 5)—M. Maldovan and E. L. Thomas. Periodic Materials and Interference Lithography. 2009 WILEY-VCH Verlag GmbH & Co. KGaA, ISBN: 978-3-527-31999-2
(Non-patent Document 6)—S. C. Kapfer, S. T. Hyde, K. Mecke, C. H. Arns, G. E. Schroder-Turk. Minimal surface scaffold designs for tissue engineering, Biomaterials. Vol. 32, pp. 6875-6882, 2011.
(Non-patent Document 7)—Seung Chul Han, Jeong Woo Lee, Kiju Kang, A New Type of Low Density Material; Shellular, Advanced Materials, pp. 5506-5511, 2015.

SUMMARY

An object to be achieved by the present disclosure is to provide a fuel cell which has high power density and efficiency and can be fabricated into a lightweight and small-sized cell having a rigid structure and a fabrication method thereof. Another object to be achieved by the present disclosure is to provide a three-dimensional membrane electrode assembly which can be used in the fuel cell.

The inventors of the present disclosure paid attention to a geometrical structure in the form of a three-dimensional thin film structure in which an inner space can be divided into two intertwined subvolumes by an interface and each of the subvolumes is continuous, and found a method of forming an MEA thin film as the interface of the three-dimensional thin film structure and using the two subvolumes as channels for fuel and an oxidizer, respectively. Then, the inventors of the present disclosure confirmed that if the three-dimensional thin film structure is configured as a TPMS, a fuel cell having a high strength for the weight, a large reaction area, and high permeability for the fuel and the oxidizer in the respective subvolumes can be realized, and thus achieved the present disclosure. The recognition about the objects and the subject matter of the present disclosure based on the recognition are as follows.

(1) A three-dimensional membrane electrode assembly (MEA) for fuel cell, including a three-dimensional thin film structure in which an inner space is divided into two intertwined subvolumes by an interface, wherein the interface is configured as an MEA thin film and a first subvolume of the two subvolumes is provided as a channel for fuel and a second subvolume is provided as a channel for an oxidizer.

(2) The three-dimensional membrane electrode assembly for fuel cell described in paragraph (1), wherein the MEA thin film includes a catalyst layer and a gas diffusion layer formed in sequence on both surfaces of an electrolyte membrane.

(3) The three-dimensional membrane electrode assembly for fuel cell described in paragraph (2), wherein the electrolyte membrane is any one of metal, polymer, and ceramic.

(4) The three-dimensional membrane electrode assembly for fuel cell described in paragraph (1), wherein the interface is a triply periodic minimal surface (TPMS).

(5) A fuel cell including: a three-dimensional membrane electrode assembly according to any one of paragraphs (1) to (4); and a casing which accommodates the three-dimensional membrane electrode assembly therein and independently communicates with the first subvolume and the second subvolume and includes inlets and outlets for fuel and an oxidizer.

(6) The fuel cell described in paragraph (5), wherein two connection terminals are separately provided, and the respective connection terminals are independently and electrically connected to a surface on the side of the first subvolume and a surface on the side of the second subvolume divided by the MEA.

(7) The fuel cell described in paragraph (5), wherein the inlets or the outlets function as connection terminals.

(8) A fabrication method of a fuel cell including: (A) forming a three-dimensional membrane electrode assembly according to any one of paragraphs (1) to (4); and (B) forming a casing which accommodates the three-dimensional membrane electrode assembly therein and includes inlets and outlets for fuel and an oxidizer, wherein the step (B) includes: (B1) filling the inside of the three-dimensional membrane electrode assembly with a filler; (B2) independently connecting a plurality of rod members to each of a first subvolume and a second subvolume of the three-dimensional membrane electrode assembly; (B3) forming a casing member so as to cover the outside of the three-dimensional membrane electrode assembly and the plurality of rod members; and (B4) removing the rod members and the filler.

(9) The fabrication method of a fuel cell described in paragraph (8), wherein the step (B2) includes exposing a part of an MEA thin film by etching an outer surface of the filler and thus removing a part of the filler before connection of the rod members.

(10) The fabrication method of a fuel cell described in paragraph (8), wherein the rod members are formed of the same material as the filler.

(11) The fabrication method of a fuel cell described in paragraph (10), further including: forming a conducting wire that connects an MEA thin film and a connection terminal before the step (B1).

(12) The fabrication method of a fuel cell described in paragraph (8), wherein the rod members are formed of a different material from the filler, and the step (B4) includes forming a conductive thin film to be electrically connected to the MEA thin film on an inner surface of the casing member from which the rod members are removed.

(13) The fabrication method of a fuel cell described in paragraph (8), wherein the step (A) includes: (A1) fabricating a three-dimensional thin film structure template; (A2) forming an electrolyte membrane on a surface of the template and then removing the template; (A3) forming a catalyst layer on both surfaces of the electrolyte membrane; and (A4) forming a gas diffusion layer on a surface of the catalyst layer.

(14) The fabrication method of a fuel cell described in paragraph (13), wherein the step (A4) includes coating and hardening a mixture solution of two polymers on the surface of the catalyst layer and removing anyone of the polymers and then performing plating.

(15) The fabrication method of a fuel cell described in paragraph (13), wherein the step (A4) includes absorbing metal powder into the catalyst layer and then performing plating.

In a fuel cell according to the present disclosure, a membrane electrode assembly (MEA) has a large surface area per unit volume as compared with a conventional fuel cell, and, thus, the production of current can be increased in proportion to the amount of ion exchange through an interface. Further, the interface dividing two subvolumes has a smooth curved surface, and, thus, even if the fuel cell is fabricated to a small size, high permeability for fuel and an oxidizer supplied to the respective subvolumes can be maintained. Therefore, it is possible to simultaneously satisfy lightweighting and miniaturization of the fuel cell as well as high efficiency. Also, in the case where the MEA is in the form of TPMS, a mean curvature is constant. Thus, when an external load is applied, a stress is not locally concentrated. Therefore, the fuel cell has a high mechanical strength resistant to a gas pressure or external load and a high resistance to thermal expansion or contraction caused by a temperature change. Thus, it is possible to minimize a weight increase caused by outer packaging or reinforcement of the fuel cell.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Hereinafter, the present disclosure will be described in detail with reference to exemplary embodiments. Terms and words used in the present specification and claims are not to be construed as a general or dictionary meaning, but are to be construed to meaning and concepts meeting the technical ideas of the present disclosure based on a principle that the inventors can appropriately define the concepts of terms in order to describe their own inventions in the best mode. Since the embodiments described in the present specification are only the most preferred embodiments of the present disclosure but do not represent for the entire technical spirit of the present disclosure. Thus, it should be understood that various equivalents and modification examples capable of replacing the embodiments and configurations of the present disclosure might exist at the time when the present application was filed. Further, in the drawings, identical or similar reference numerals typically identify identical or equivalent components, and through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Configuration and Operation of Three-Dimensional Membrane Electrode Assembly and Fuel Cell A configuration and an operation of a three-dimensional membrane electrode assembly 10 and a fuel cell 1 according to exemplary embodiments of the present disclosure will be described with reference to FIG. 4 through FIG. 6.

Figure 4:
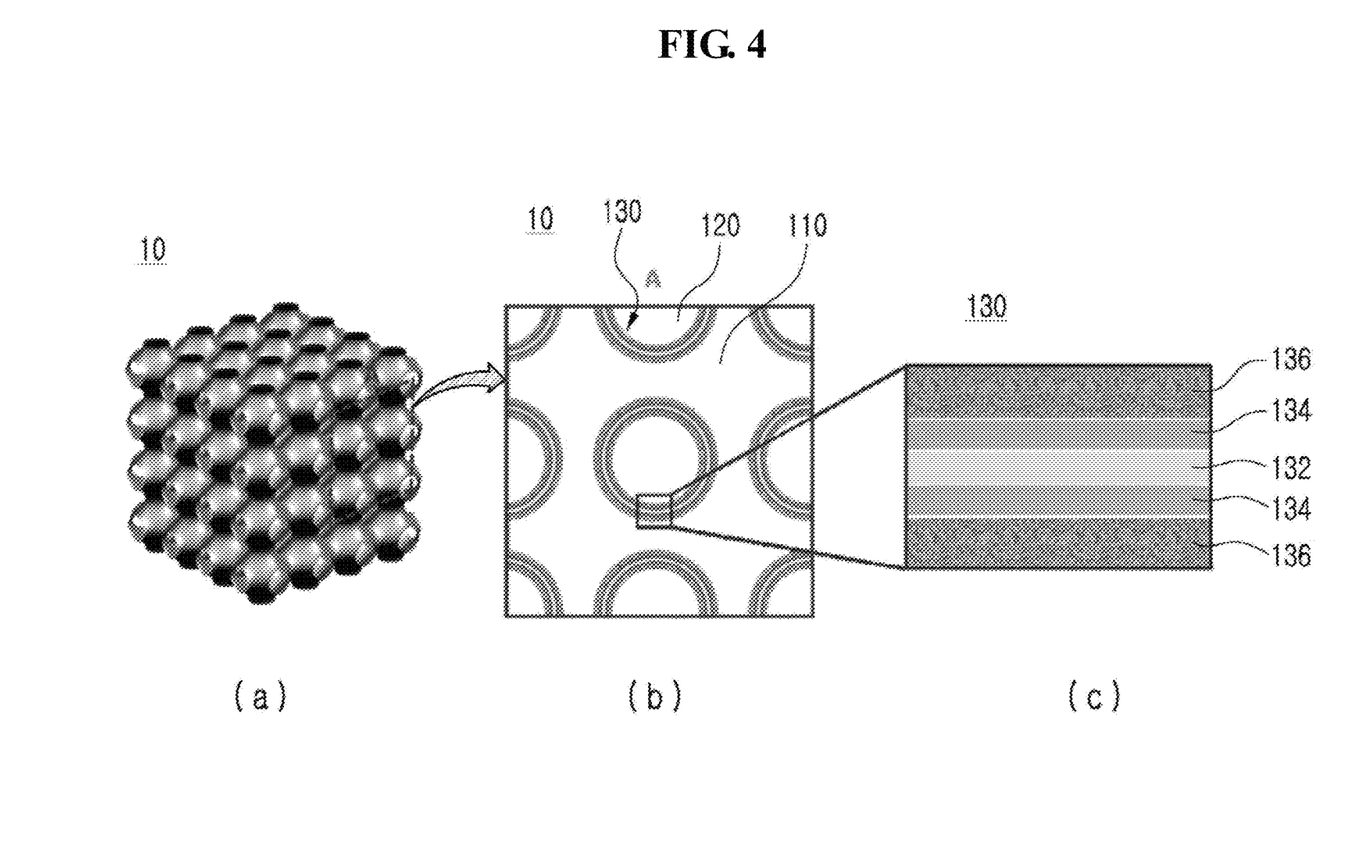
FIG. 4 is a configuration view of a three-dimensional membrane electrode assembly according to exemplary embodiments of the present disclosure.

FIG. 4 is a configuration view of a three-dimensional membrane electrode assembly 10 according to exemplary embodiments of the present disclosure. FIG. 4A is a perspective view, FIG. 4B is a cross-sectional view, and FIG. 4C is a cross-sectional enlarged view of an MEA thin film 130. The three-dimensional membrane electrode assembly 10 is a three-dimensional thin film structure in which an inner space is divided into two intertwined subvolumes 110 and 120 by an interface, and the interface is configured as the MEA thin film 130. In an exemplary embodiment illustrated in FIG. 4, a geometrical structure of the three-dimensional membrane electrode assembly 10 is exemplified as "P-Surface" of TPMSes of FIG. 3.

Figure 5:
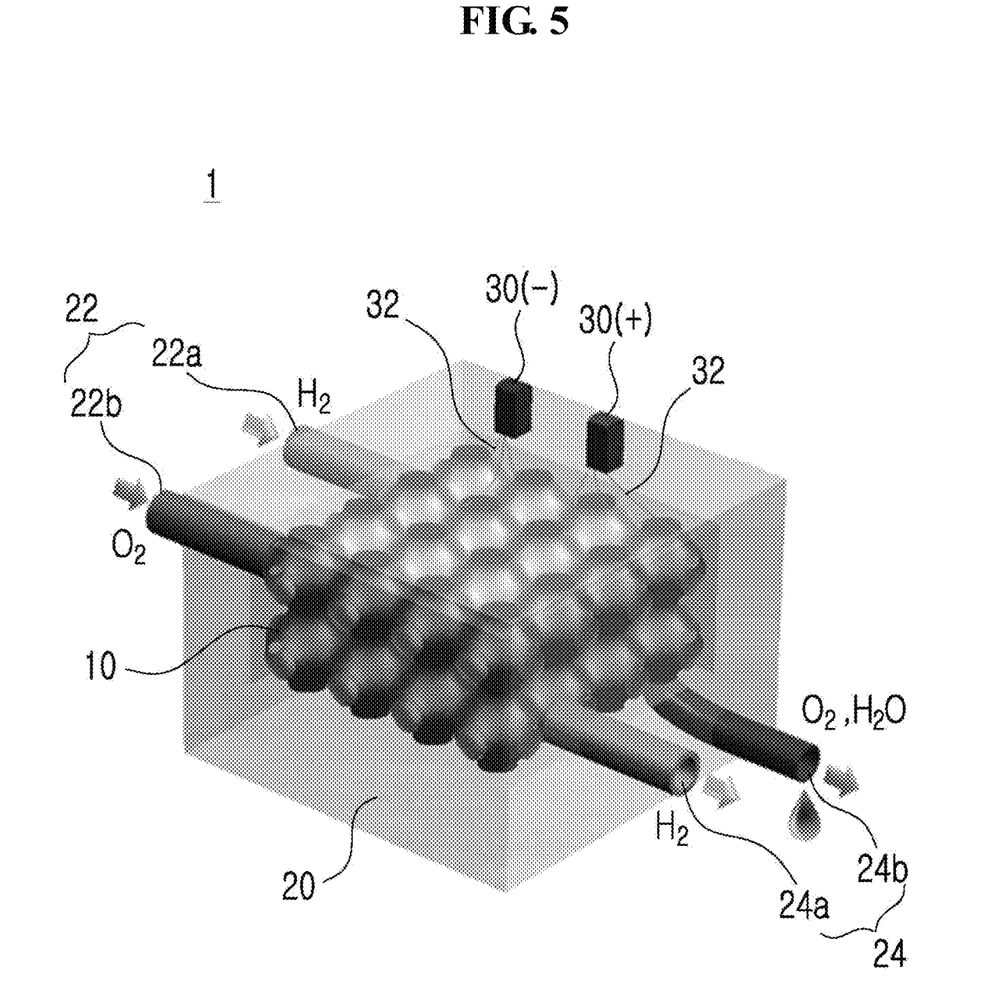
FIG. 5 is a perspective view of a fuel cell according to exemplary embodiments of the present disclosure.

The MEA thin film 130 divides a first subvolume 110 and a second subvolume 120 when used in the fuel cell 1 (FIG. 5). In this case, the first subvolume 110 is provided as a channel for fuel such as hydrogen and the second subvolume 120 is provided as a channel for an oxidizer such as oxygen or air. The second subvolume 120 as a channel for an oxidizer also serves as a channel for water vapor or water which is a product of an electrochemical reaction.

The MEA thin film 130 is illustrated as a total of five layers including a catalyst layer 134 and a gas diffusion layer (GDL) 136 formed in sequence on both surfaces of an electrolyte membrane 132 as depicted in FIG. 4B and FIG. 4C. In the catalyst layer 134, an electrochemical reaction such as oxidation or reduction of fuel or an oxidizer occurs. The GDL 136 functions to transfer the fuel or the oxidizer to the catalyst layer 134 and collect generated electricity and then transfer the electricity toward a connection terminal 30 connected to an external circuit. Further, the GDL 136 functions to equalize the concentration of the fuel or the oxidizer regardless of a position of the MEA thin film 130. If the GDL 136 is not present, the concentration of the fuel or the oxidizer to be absorbed into the MEA thin film 130 may vary depending on fluid flow and position. Ions are exchanged through the electrolyte membrane 132, and the electrolyte membrane 132 may be formed as a fluorine resin-based ion-exchange membrane such as Nafion or may be formed of other materials such as metal or ceramic which can selectively allow positive ions only to pass through.

Meanwhile, the geometrical structure of the three-dimensional membrane electrode assembly 10 may include any structure which can be divided into the two intertwined subvolumes 110 and 120 by the interface in the form of a smooth curved surface. In an exemplary embodiment, the geometrical structure of the three-dimensional membrane electrode assembly 10 is exemplified as "P-Surface" of FIG. 3, but can be another TPMS. Particularly, if the geometrical structure of the three-dimensional membrane electrode assembly 10 is configured as a TPMS according to an exemplary embodiment, it is advantageous in realizing the fuel cell having a high strength for the weight, a large reaction area, and high permeability for the fuel and the oxidizer.

Specifically, the two subvolumes 110 and 120 of the three-dimensional membrane electrode assembly 10 are intertwined and form smoothly continuous spaces, respectively. Therefore, when a gas phase or liquid phase fluid is moved in the first subvolume 110 and the second subvolume 120, a flow resistance is remarkably decreased, and, thus, the permeability may be greatly increased. Further, if the MEA thin film 130 is in the form of TPMS, a pressure of about 1.2 atm may be generated in the first subvolume 110 through which hydrogen passes and a pressure of about 1 atm may be generated in the second subvolume 120 through which oxygen passes. Even if a pressure difference or external load is applied to the two subvolumes 110 and 120, early local buckling of the three-dimensional membrane electrode assembly 10 can be effectively suppressed. Therefore, it is possible to simultaneously satisfy the requirements for permeability, lightweighting, and rigidity which have hardly been compatible with each other in the conventional fuel cell 1.

Furthermore, the three-dimensional membrane electrode assembly 10 has a structure in which a small-sized unit structure including the two subvolumes 110 and 120 divided by the MEA thin film 130 is regularly repeated in three-dimensional space. Therefore, it is possible to freely design the fuel cell 1 using the three-dimensional membrane electrode assembly 10 to have a desired shape in a macro view.

FIG. 5 is a perspective view of the fuel cell 1 using the three-dimensional membrane electrode assembly 10. The fuel cell 1 includes the three-dimensional membrane electrode assembly 10 and a casing 20. The casing 20 independently communicates with the first subvolume 110 and the second subvolume 120 as the two subvolumes 110 and 120 of the three-dimensional membrane electrode assembly 10 and includes inlets 22 (22a and 22b) and outlets 24 (24a and 24b) for fuel such as hydrogen and an oxidizer such as oxygen or air, respectively. In the drawings, the casing 20 is illustrated as being transparent for convenience in illustration of the status of the three-dimensional membrane electrode assembly 10 accommodated within the fuel cell 1.

In this case, the inlet 22a and outlet 24a for the fuel communicate with the first subvolume 110 and the inlet 22b and outlet 24b for the oxidizer communicate with the second subvolume 120. Thus, each of the first subvolume 110 and the second subvolume 120 is provided as an independent channel. The outlet 24b for the oxidizer also serves as a channel for water vapor or water which is a product of an electrochemical reaction.

The casing 20 functions to physically protect the three-dimensional membrane electrode assembly 10 and also shield the whole external open part of the two subvolumes 110 and 120 of the three-dimensional membrane electrode assembly 10 except the inlets 22 (22a and 22b) and the outlets 24 (24a and 24b). Preferably, the casing 20 may be formed of resin.

In the exemplary embodiment illustrated in FIG. 5, positive (+) and negative (−) connection terminals 30 are separately provided outside the casing 20, and the connection terminals 30 are electrically connected through conducting wires 32 to the respective gas diffusion layers 136 of the MEA thin film 130 facing the insides of the two subvolumes 110 and 120. Since the gas diffusion layers 136 of the MEA thin film 130 are electrically conductive, the number of conducting wires 32 can be randomly determined despite the illustration in the drawings.

Meanwhile, since the connection terminals 30 are configured to connect electricity generated from the MEA thin film 130 to the external circuit, they can be realized in different forms. For example, the inlets 22 (22a and 22b) and the outlets 24 (24a and 24b) connected to the MEA thin film 130 of the two subvolumes 110 and 120 may be formed of a conductive material and thus can function as the connection terminals 30 (not illustrated in the drawings).

Figure 6:
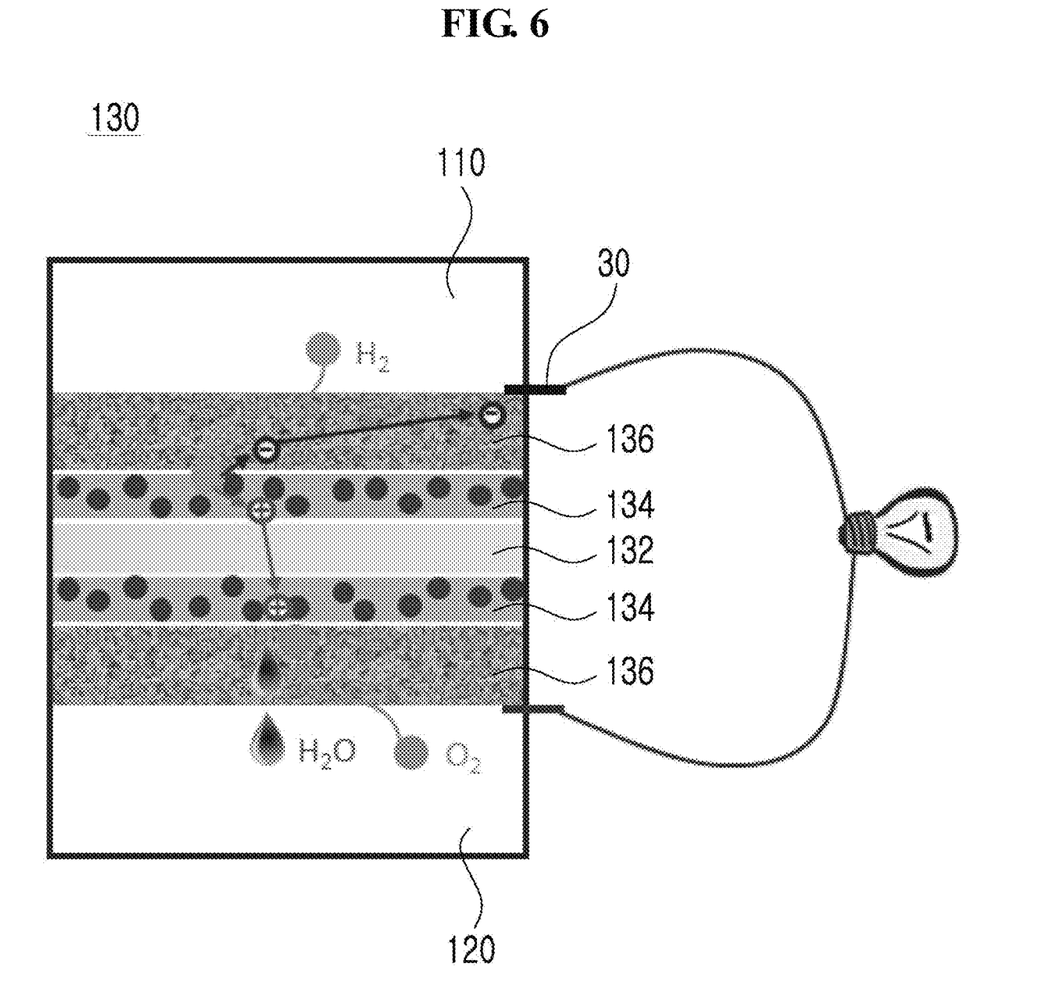
FIG. 6 is an operation conceptual diagram of a MEA thin film according to exemplary embodiments of the present disclosure.

FIG. 6 is an operation conceptual diagram of the MEA thin film 130. If hydrogen fuel is supplied to the first subvolume 110 and reaches the gas diffusion layer 136 and the catalyst layer 134 of the first subvolume 110, the hydrogen fuel is catalyzed and separated into hydrogen protons and electrons via an oxidation reaction according to the following Formula 1. The separated electrons pass through the conductive gas diffusion layer 136 in contact with the catalyst layer 134 and move to the gas diffusion layer 136 and the catalyst layer 134 of the second subvolume 120 via the external positive (+) and negative (−) connection terminals 30, and the hydrogen protons pass through the electrolyte membrane 132 and then reach the catalyst layer 134 of the second subvolume 120. If an oxygen oxidizer supplied into the second subvolume 120 reaches the gas diffusion layer 136 and the catalyst layer 134 of the second subvolume 120, a reduction reaction of oxygen occurs according to the following Formula 2, and, thus, the hydrogen protons are combined with oxygen to water. The electrochemical oxidation and reduction reactions can be abstracted as an oxidation reaction of hydrogen as exhibited in the following Formula 3, and electricity is generated by the movement of the separated electrons.

$$H_2 \rightarrow 2H^+ + 2e^-$$ [Chemical Formula 1]

$$\tfrac{1}{2}O_2 + 2H^+ + 2e^- \rightarrow H_2O$$ [Chemical Formula 2]

$$H_2 + \tfrac{1}{2}O_2 \rightarrow 2H_2O$$ [Chemical Formula 3]

Fabrication of Fuel Cell

A fabrication method of the fuel cell 1 according to exemplary embodiments of the present disclosure will be described with reference to FIG. 7 through FIG. 10.

Figure 7:
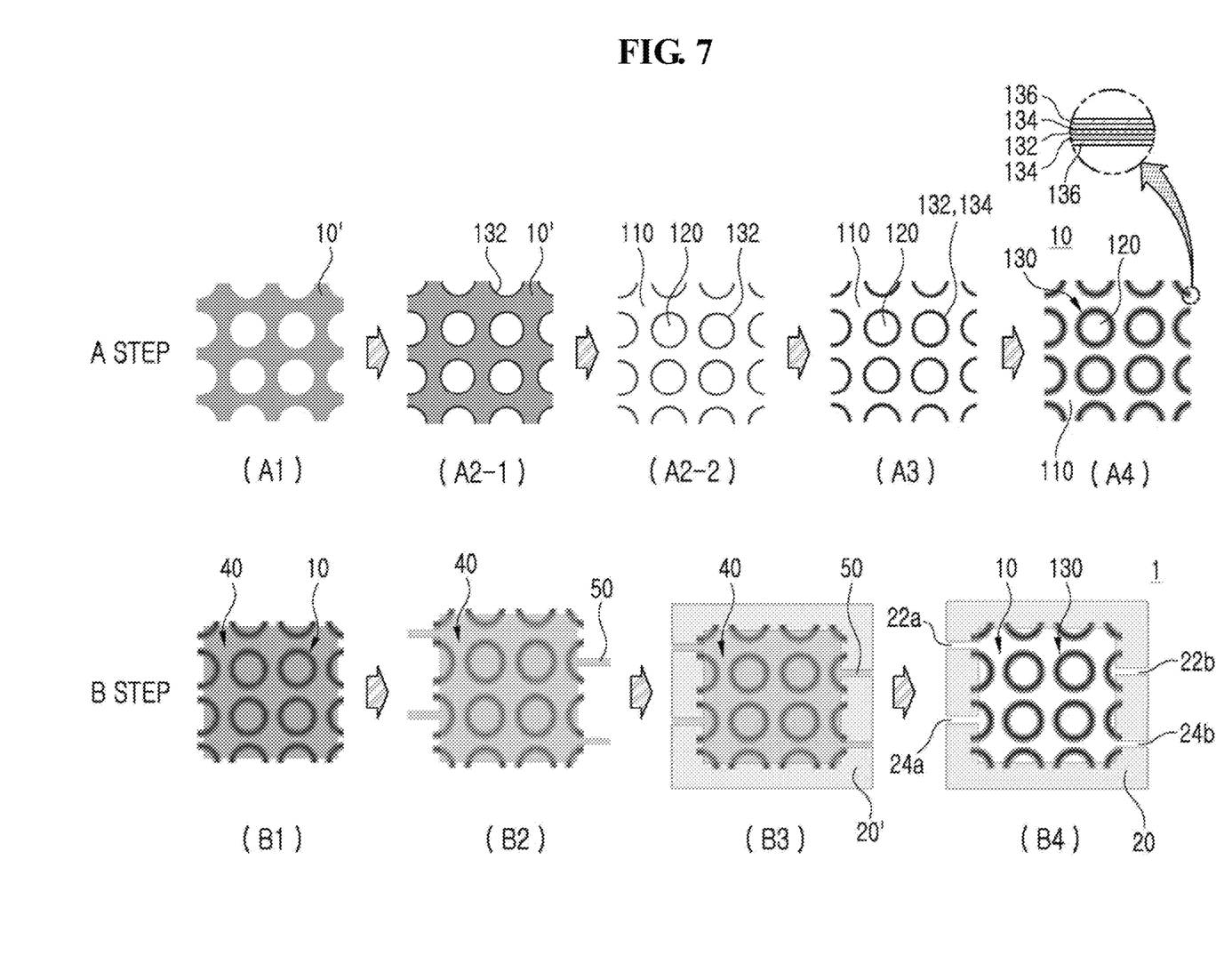
FIG. 7 is a manufacturing process diagram of the fuel cell according to exemplary embodiments of the present disclosure.

FIG. 7 is a manufacturing process diagram of the fuel cell 1 according to exemplary embodiments of the present disclosure. The fabrication method of the three-dimensional fuel cell 1 according to exemplary embodiments of the present disclosure basically includes: (A) forming the three-dimensional membrane electrode assembly 10; and (B) forming the casing 20 which accommodates the three-dimensional membrane electrode assembly 10 therein and includes the inlets 22 and the outlets 24 for fuel and an oxidizer. For reference, the three-dimensional membrane electrode assembly 10 has a structure in which an inner space is divided into the two subvolumes 110 and 120 by the MEA thin film 130, and in the drawings, a structure of the three-dimensional membrane electrode assembly 10, a template 10' for fabricating the three-dimensional membrane electrode assembly 10, and the fuel cell 1 is schematically illustrated as a two-dimensional cross-sectional structure.

The step (A) is a process of fabricating the three-dimensional thin film structure template 10' having a geometrical structure corresponding to the three-dimensional membrane electrode assembly 10 and then forming the MEA thin film 130 as the interface on the basis of the template 10', and includes: (A1) fabricating the three-dimensional thin film structure template 10'; (A2) forming the electrolyte membrane 132 on a surface of the template 10' (A2-1) and then removing the template 10' (A2-2); (A3) forming the catalyst layer 134 on both surfaces of the electrolyte membrane 132; and (A4) forming the gas diffusion layer 136 on a surface of the catalyst layer 134.

Meanwhile, some processes in the step (A) can be performed using the fabrication method based on the photo lithography as disclosed by the inventors of the present disclosure through the previous paper (S. C. Han, J. W. Lee, K. Kang. A new type of low density material; Shellular. Advanced Materials, Vol. 27, pp. 5506-5511, 2015.), and the paper may be incorporated herein by reference in its entirety. The present disclosure is characterized in that the thin film described in the previous paper is realized as the MEA thin film 130 including the electrolyte membrane, the catalyst layer 134, and the gas diffusion layer 136. Hereinafter, detailed processes thereof will be mainly described, and an example in which the MEA thin film 130 is configured on the basis of the Nafion electrolyte membrane 132 will be described. However, the present disclosure may not be limited to a TPMS structure similar to P-surface described in the previous paper, and may include a TPMS structure in various shapes as described above. Further, the electrolyte membrane 132 is formed of fluorine resin-based Nafion in an exemplary embodiment and can also be formed of metal, ceramic, or other polymers depending on the use thereof.

In the step (A1), four-directional UV rays are irradiated to a liquid thiolene monomer resin through a mask, and an intaglio solid polymer template 10' is obtained and then secondarily hardened in an oven at 120° C. This method is performed on the basis of the photo lithography as described in the previous paper.

Then, in the step (A2), the template 10' is immersed in a Nafion 5 wt % isopropyl alcohol solution and then taken out to be hardened. Thus, the Nafion thin film 132 is coated on a surface of the template 10'. A part of the coated Nafion thin film 132 is removed by grinding to expose a part of the template 10' to the outside and then etch the inner thiolene template 10' with sodium hydroxide (NaOH), and, thus, a Nafion electrolyte thin film structure can be obtained. Therefore, the two subvolumes 110 and 120 are formed with the electrolyte thin film 132 as an interface within the structure.

Then, in the step (A3), the Nafion electrolyte thin film structure is immersed in a Nafion 5 wt % isopropyl alcohol solution including carbon and platinum powder and then taken out to be hardened. Then, the catalyst layer 134 is formed on both surfaces of the electrolyte thin film. Then, a remaining organic material is removed using a hydrogen peroxide solution, and hydrogen protons are generated in advance within the Nafion thin film 132 using a sulfuric acid solution and then kept in distilled water (R. Kuwertz et al., Influence of acid pretreatment on ionic conductivity of Nafions membranes, Journal of Membrane Science 500 (2016) 225-235.).

Finally, in the step (A4), the gas diffusion layer 136 is formed on the catalyst layer 134 to complete the three-dimensional membrane electrode assembly 10. In the present disclosure, the gas diffusion layer 136 is a conductive porous layer, and the following two methods are examples of methods for forming the gas diffusion layer 136.

Figure 8:
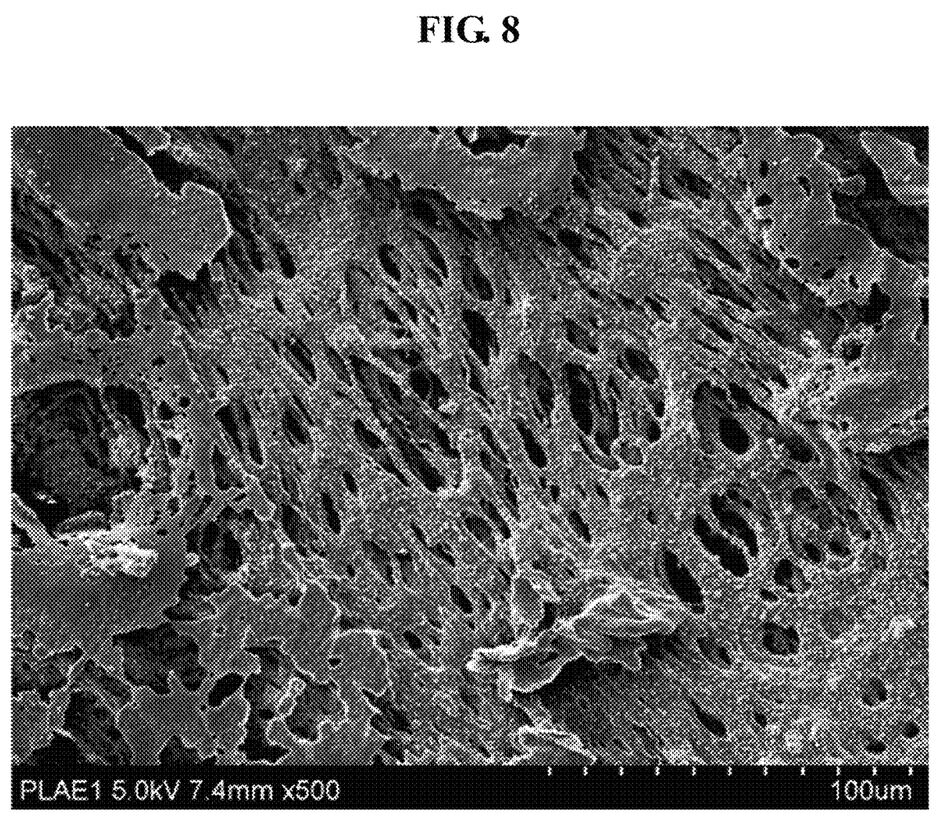
FIG. 8 is an electron microscope image of a gas diffusion layer according to exemplary embodiments of the present disclosure.
Figure 9:
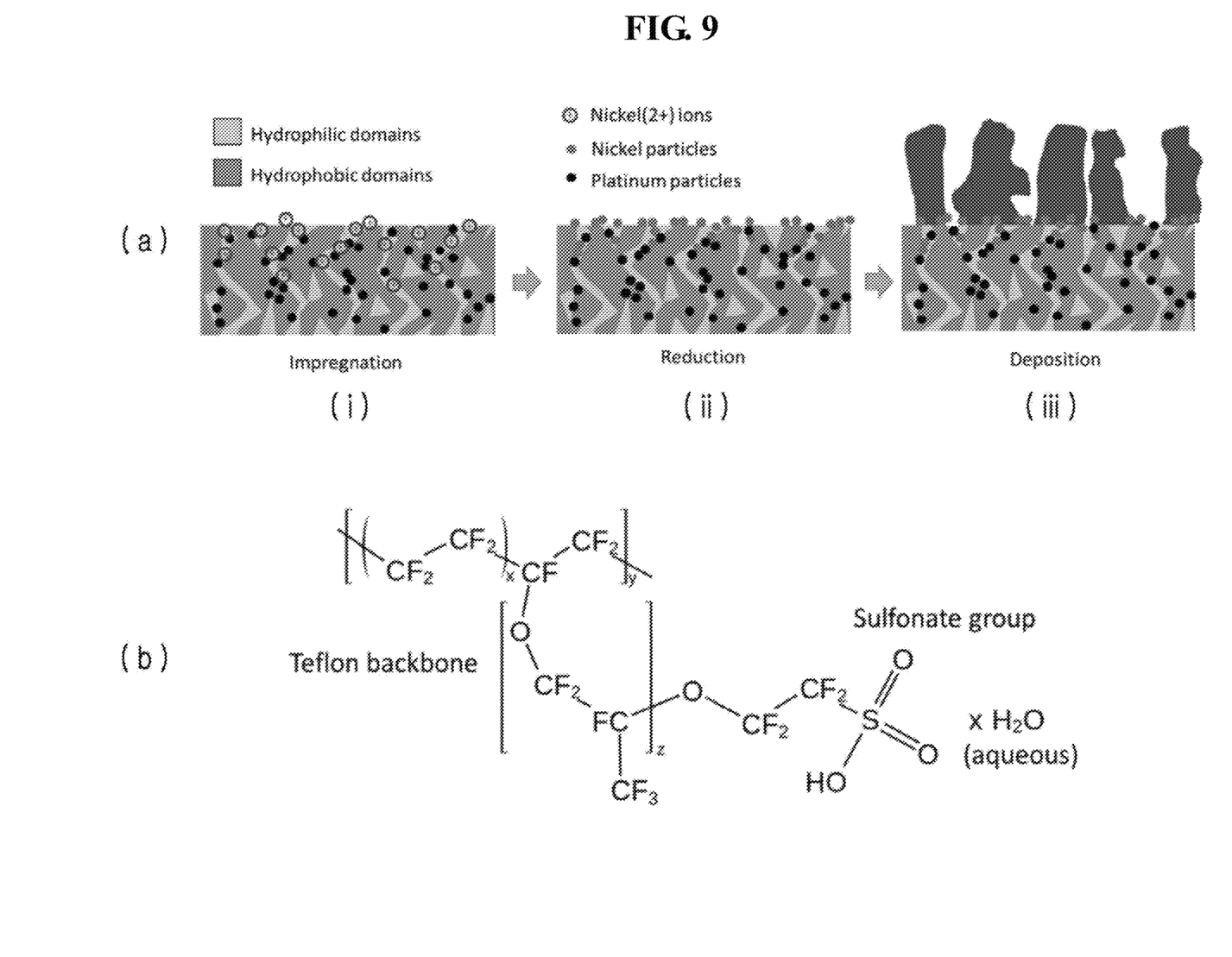
FIG. 9 is a process diagram illustrating the formation of the gas diffusion layer according to exemplary embodiments of the present disclosure.

In a first method, a mixture solution of two polymers may be coated and hardened on a surface of the catalyst layer 134 and then, any one of the polymers may be removed and electroless plating may be performed. For example, as listed in the following Table 1, the thin film structure including the catalyst layer 134 on the Nafion thin film 132 is immersed in an A and B mixture solution prepared using a solvent for two polymers A and B and then taken out to be hardened. Then, the polymer A is removed with an etchant so as to form a porous polymer B layer. Then, electroless plating is performed to the porous polymer B layer with a metal coating solution, and, thus, the gas diffusion layer 136 with conductivity can be formed. FIG. 8 is an electron microscope image of the gas diffusion layer 136 formed by this method.

TABLE 1

| Polymer A | Polymer B | Solvent for both A & B | Etchant for A |
| --- | --- | --- | --- |
| PEG | PLA | Chloroform | Water |
| PVA | PLA | Chloroform | Hot Water |

In a second method, metal powder may be absorbed into the catalyst layer 134 and then plating may be performed. For example, nickel powder obtained by reducing a nickel compound as a metal compound may be absorbed into a surface of the catalyst layer 134 and then electroless plating may be performed thereto, and, thus, the conductive porous gas diffusion layer 136 can be obtained. FIG. 9A is a schematic diagram illustrating the principle of forming the gas diffusion layer 136. The Nafion thin film 132 which is a substrate including the platinum catalyst layer 134 is a kind of copolymer including a hydrophobic Teflon backbone area and a hydrophilic sulfonate area as illustrated in FIG. 9B. In this case, the Nafion thin film 132 absorbs water through the process in the step (A3), the hydrophilic sulfonate area can serve as a kind of channel for ions, which can be used for forming nickel powder in this area (FIG. 9A (i) and (ii)). Then, nickel (Ni) electroless plating is performed using the nickel powder as a seed (FIG. 9A (iii)) so as to obtain the conductive porous gas diffusion layer 136.

The second method will be described in more detail as follows. Firstly, the structure including the catalyst layer 134 on the Nafion thin film 132 is immersed in a nickel compound aqueous solution such as nickel sulfate ($NiSO_4$) for a long time of several hours to 24 hours to absorb nickel (Ni) ions into the Nafion hydrophilic area of the catalyst layer 134 (FIG. 9A (i)). Then, the nickel compound aqueous solution is appropriately induced to make reduction and oxidation reaction and the reduced nickel powder is formed in the hydrophilic area (FIG. 9A (ii)). For example, the nickel powder may be reduced by heating the nickel sulfate ($NiSO_4$) aqueous solution to 60° C. and then adding sodium borohydride ($NaBH_4$) thereto. A reaction formula thereof is as exhibited in the following Formula 4.

$2Ni^{2+}(eg)+BH_4^-(s)+2H_2O(eg)+2nPVP(eg) \rightarrow 2Ni(PVP)_n(s)+2H_2(g)+4H^+(eg)+BO_2^-(eg)$ [Chemical Formula 4]

Figure 10:
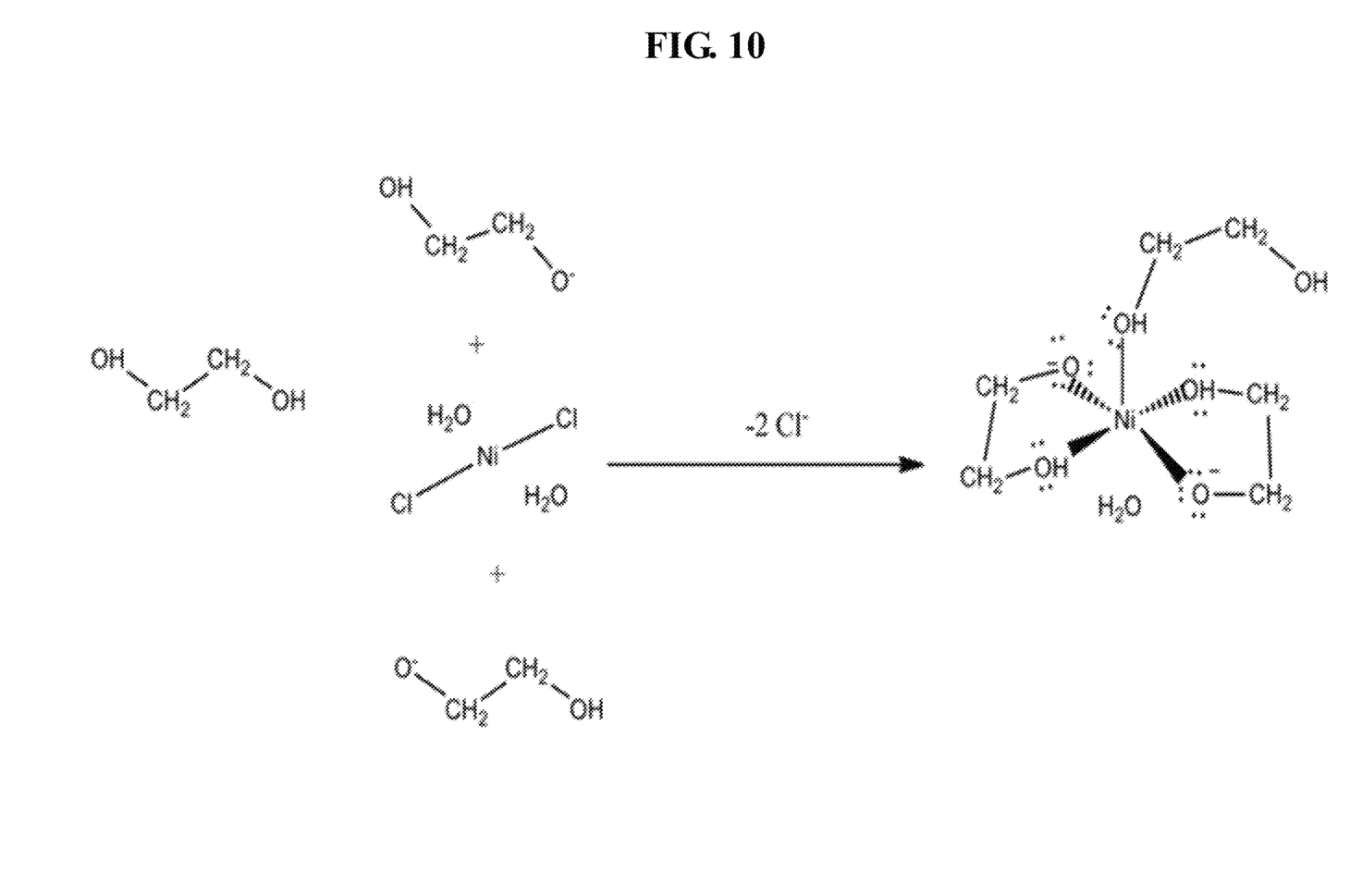
FIG. 10 is a conceptual diagram illustrating a polyol process accompanied with the process illustrated in FIG. 9.

Herein, the technology of attracting the nickel ions to the hydrophilic area and performing reduction is a kind of impregnation-reduction (J. Chou, E. W. McFarland, H. Metiu, Electro-lithographic Investigations of the Hydrophilic Channels in Nafion Membranes, J. Phys. Chem. B (2005), 109, 3252-3256.). In this case, the reduced nickel powder receives attraction from a plurality of surrounding hydroxyl groups (OH) and thus is dispersed without being aggregated and then present stably. The technology of retaining the reduced nickel as being dispersed by the action of hydroxyl groups is referred to as a polyol process (N. R. Nik Roselina, A. Azizan, Ni nanoparticles: Study of particles formation and agglomeration, Procedia Engineering 41 (2012) 1620-1626.). FIG. 10 illustrates an example of the polyol process. In addition to nickel formed on the surface of the catalyst layer 134, a platinum catalyst originally included in the catalyst layer 134 also serves as a seed for electroless plating as illustrated in FIG. 9A (iii).

The step (B) is a process of packaging the three-dimensional membrane electrode assembly 10 and forming functional elements required for the fuel cell 1, and includes: (B1) filling the inside of the three-dimensional membrane electrode assembly 10 with a filler 40; (B2) independently connecting the plurality of rod members 50 to each of the first subvolume 110 and the second subvolume 120 of the three-dimensional membrane electrode assembly 10; (B3) forming a casing member 20' so as to cover the outside of the three-dimensional membrane electrode assembly 10 and the plurality of rod members 50; and (B4) removing the rod members 50 and the filler 40. In this case, the filler 40, the casing member 50, and the casing member 20' may be formed of homogenous or heterogenous resin. Herein, the casing member 20' needs to be formed of a different material from the filler 40 and the rod members 50 in order for the filler 40 and the rod members 50 to be selectively removed by chemical etching or the like.

In the step (B1), the filler 40 functions to suppress deformation of the three-dimensional membrane electrode assembly 10 during the process and suppress the introduction of the casing member 20' into the subvolumes of the three-dimensional membrane electrode assembly 10 during the subsequent process and is finally removed in the subsequent process. The filler 40 can be formed by immersing the three-dimensional membrane electrode assembly 10 fabricated in the step (A) in a liquid resin such as thiolene and then primarily hardening the liquid resin with UV and then heating the resin in an electric furnace at 120° C. for 6 hours to 12 hours. Therefore, the two subvolumes 110 and 120 in the three-dimensional membrane electrode assembly 10 are filled with the hardened filler 40. In this case, the filler 40 may be formed using the same thiolene material as the template 10' for fabricating the three-dimensional membrane electrode assembly 10.

Meanwhile, although not illustrated in the drawings, the connection terminals 30 (FIG. 5) may be provided as separate components. In this case, forming the metal conducting wires 32 (FIG. 5) such as copper wires connecting the MEA thin film 130 of the three-dimensional membrane electrode assembly 10 to the connection terminals 30 may be further included selectively before the filler 40 is formed.

In the step (B2), the rod members 50 function as a mold for forming the inlets 22 and the outlets 24 for fuel and oxidizer in the fuel cell 1, and is finally removed in the subsequent process together with the filler 40. The rod members 50 may be connected by hardening a liquid resin into a rod shape and bonding the rods to the positions of the inlets 22 (22a and 22b) and the outlets 24 (24a and 24b) in the two subvolumes 110 and 120 of the three-dimensional membrane electrode assembly 10.

In this case, removing apart of the filler 40 and thus exposing a part of the MEA thin film 130 may be further included selectively before the rod members 50 are connected. Specifically, after the step (B1), the three-dimensional membrane electrode assembly 10 is exposed to the outside by grinding the surface thereof and processed in a 1 M sodium hydroxide solution (NaOH) for a short time of 5 minutes. Thus, the hardened thiolene filler 40 present on the outer surface is partially etched and removed and a part of the MEA thin film 130 is exposed as being slightly protruded to the outer surface. In a state where a part of the MEA thin film 130 is exposed by slightly etching and removing the entire surface of the filler 40, the casing member 20' may be rigidly combined with the exposed MEA thin film 130 in the subsequent process. Thus, the two subvolumes 110 and 120 are completely isolated from each other, which can suppress the leakage or mixing of fuel and an oxidizer.

Meanwhile, the rod members 50 may be formed of homogenous or heterogenous material as the filler 40. If the rod members 50 are formed of the same material as the filler 40, the rod members 50 and the filler 40 can be removed through a single process. However, before the step (B1), a process of separately forming the conducting wires 32 for connecting the MEA thin film 130 and the connection terminals 30 may be needed. If the rod members 50 are formed of a different material from the filler 40, a conductive thin film (not illustrated in the drawings) electrically connected to the MEA thin film 130 may be formed on an inner surface from which the rod members 50 are removed and may function as the connection terminals 30 connected to the external circuit.

In the step (B3), the casing member 20' functions to physically protect the three-dimensional membrane electrode assembly 10 by packaging the fuel cell 1 and also shield the whole external open part of the two subvolumes 110 and 120 of the three-dimensional membrane electrode assembly 10. The casing member 20' may be formed by entirely covering the three-dimensional membrane electrode assembly 10 and the rod members 50 with liquid resin, for example, thermoplastic acrylic hot mounting resin, different from the filler 40 and the rod members 50 and then hardening the liquid resin.

Finally, in the step (B4), the rod members 40 and the filler 40 are removed in sequence, and, thus, the inlet 22 and the outlet 24 for fuel are provided, thereby completing the process of fabricating the fuel cell 1 having a structure in which the subvolumes of the three-dimensional membrane electrode assembly 10 are empty. The rod members 50 and the filler 40 may be selectively removed by polishing the outer surface of the packaging member to expose a part of the rod members 50 after the step (B3) and then selectively removing the rod members 50 and the filler 40 connected thereto within the subvolumes with an etchant. For example, if the filler 40 and the rod members 50 are formed of the same material, thiolene, a 3 M sodium hydroxide solution (NaOH) can be used as a common etchant. Meanwhile, if the filler 40 and the rod members 50 are formed of heterogenous materials, etchants with respective selectivities therefor can be used separately. If necessary, a conductive thin film (not illustrated in the drawings) electrically connected to the MEA thin film 130 may be formed on the inner surface from which the rod members 50 are removed before the filler 40 is removed and may function as the connection terminals 30 connected to the external circuit.

As described above, according to the present disclosure, the membrane electrode assembly 10 of the fuel cell 1 has a large surface area per unit volume as compared with a conventional fuel cell, and, thus, the production of current can be increased in proportion to the amount of ion exchange through an interface. Further, the MEA thin film 130 dividing the two subvolumes 110 and 120 has a smooth curved surface, and, thus, even if the fuel cell 1 is fabricated to a small size, high permeability for fuel and an oxidizer supplied to the respective subvolumes 110 and 120 can be maintained. Therefore, it is possible to simultaneously satisfy lightweighting and miniaturization of the fuel cell 1 as well as high efficiency. Also, in the case where the membrane electrode assembly 10 is in the form of TPMS, a mean curvature is constant. Thus, when an external load is applied, a stress is not locally concentrated. Therefore, the fuel cell has a high mechanical strength resistant to a gas pressure or external load and a high resistance to thermal expansion and contraction caused by a temperature change. Thus, it is possible to minimize a weight increase caused by outer packaging or reinforcement of the fuel cell 1.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present invention. The protective scope of the present disclosure should be construed based on the following claims, and all the technical concepts in the equivalent scope thereof should be construed as falling within the scope of the present disclosure.

[Explanation of Reference Numerals]

1: Fuel cell
10: Three-dimensional membrane electrode assembly
110: First subvolume
120: Second subvolume
130: MEA thin film
132: Electrolyte membrane
134: Catalyst layer
136: Gas diffusion layer
20: Casing
22, 22a, 22b: Inlet
24, 24a, 24b: Outlet
30: Connection terminal
32: Conducting wire
10': Template
20': Casing member
40: Filler
50: Rod member

What is claimed is:

1. A three-dimensional membrane electrode assembly (MEA) for fuel cell, comprising:
a three-dimensional thin film structure in which an inner space is divided into two intertwined subvolumes by an interface which is a single curved continuous surface,
wherein the interface is configured as a single continuous MEA thin film, surrounds a first subvolume which is a first single continuous empty space configured to flow fuel therethrough, and surrounds a second subvolume which is a second single continuous empty space intertwined with the first single continuous empty space and configured to flow an oxidizer therethrough,
wherein the three-dimensional thin film structure is formed by a plurality of unit structures in which a unit structure, including a portion of the interface, a portion of the first subvolume, and a portion of the second subvolume, is continuously, regularly, and repeatedly formed in x, y, and z directions of an XYZ-coordinate system, wherein each unit structure of the plurality of unit structure is continuously connected to adjacent unit structure in the x, y, and z directions such that the interface, the first subvolume, and the second subvolume are defined, and wherein the interface is a triply periodic minimal surface (TPMS) which is a single continuous surface and having a zero or constant mean curvature as a curve structure which is non-self intersecting but repeated periodically in a three-dimensional space in the x, y, and z directions.

2. The three-dimensional membrane electrode assembly for fuel cell according to claim 1, wherein the single continuous MEA thin film includes a catalyst layer and a gas diffusion layer formed in sequence on both surfaces of an electrolyte membrane.

3. The three-dimensional membrane electrode assembly for fuel cell according to claim 2, wherein the electrolyte membrane is any one of metal, polymer, and ceramic.

4. The three-dimensional membrane electrode assembly for fuel cell according to claim 1, wherein the first subvolume and the second subvolume have substantially the same volume ratio of 1:1.

5. A fuel cell comprising:
   a three-dimensional membrane electrode assembly according to claim 1; and
   a casing which accommodates the three-dimensional membrane electrode assembly therein and independently communicates with the first subvolume and the second subvolume and includes inlets and outlets for fuel and an oxidizer, respectively.

6. The fuel cell according to claim 5, wherein two connection terminals are separately provided, and the respective connection terminals are independently and electrically connected to a surface on the side of the first subvolume and a surface on the side of the second subvolume.

7. The fuel cell according to claim 5, wherein the inlets or the outlets function as connection terminals.

8. A fabrication method of a fuel cell, comprising:
   (A) forming a three-dimensional membrane electrode assembly according to claim 1; and
   (B) forming a casing which accommodates the three-dimensional membrane electrode assembly therein and includes inlets and outlets for fuel and an oxidizer,
   wherein the step (B) forming a casing includes:
   (B1) filling the inside of the three-dimensional membrane electrode assembly with a filler;
   (B2) independently connecting a plurality of rod members to each of a first subvolume and a second subvolume of the three-dimensional membrane electrode assembly;
   (B3) forming a casing member so as to cover the outside of the three-dimensional membrane electrode assembly and the plurality of rod members; and
   (B4) removing the rod members and the filler.

9. The fabrication method of a fuel cell according to claim 8, wherein the step (B2) includes exposing a part of an MEA thin film by etching an outer surface of the filler and thus removing a part of the filler before connection of the rod members.

10. The fabrication method of a fuel cell according to claim 8, wherein the rod members are formed of the same material as the filler.

11. The fabrication method of a fuel cell according to claim 10, further comprising:
   forming a conducting wire that connects an MEA thin film and a connection terminal before the step (B1).

12. The fabrication method of a fuel cell according to claim 8, wherein the rod members are formed of a different material from the filler, and the step (B4) includes forming a conductive thin film to be electrically connected to the MEA thin film on an inner surface of the casing member from which the rod members are removed.

13. The fabrication method of a fuel cell according to claim 8, wherein the step (A) forming a three-dimensional membrane electrode assembly includes:
   (A1) fabricating a three-dimensional thin film structure template;
   (A2) forming an electrolyte membrane on a surface of the template and then removing the template;
   (A3) forming a catalyst layer on both surfaces of the electrolyte membrane; and
   (A4) forming a gas diffusion layer on a surface of the catalyst layer.

14. The fabrication method of a fuel cell according to claim 13, wherein the step (A4) includes coating and hardening a mixture solution of two polymers on the surface of the catalyst layer and removing any one of the polymers and then performing plating.

15. The fabrication method of a fuel cell according to claim 13, wherein the step (A4) includes absorbing metal powder into the catalyst layer and then performing plating.

* * * * *